United States Patent
Kurihara et al.

(10) Patent No.: US 8,426,073 B2
(45) Date of Patent: Apr. 23, 2013

(54) FUEL CELL SYSTEM AND METHOD OF CONTROLLING SAME

(75) Inventors: Kazuaki Kurihara, Kawasaki (JP);
John David Baniecki, Kawasaki (JP);
Masatoshi Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 329 days.

(21) Appl. No.: 12/720,002

(22) Filed: Mar. 9, 2010

(65) Prior Publication Data
US 2010/0233796 A1 Sep. 16, 2010

(30) Foreign Application Priority Data

Mar. 16, 2009 (JP) ................................ 2009-063182
Dec. 7, 2009 (JP) ................................ 2009-277796

(51) Int. Cl.
*H01M 8/18* (2006.01)
*H01M 8/04* (2006.01)
*C12M 3/00* (2006.01)

(52) U.S. Cl.
USPC ........................ 429/417; 429/419; 435/289.1

(58) Field of Classification Search .......... 429/417–419; 435/289.1
See application file for complete search history.

(56) References Cited

U.S. PATENT DOCUMENTS 7,144,445 B2 * 12/2006 Gueret et al. ..................... 95/96
8,114,363 B1 * 2/2012 Golben ......................... 422/600
2005/0164051 A1 * 7/2005 Venkataraman et al. ....... 429/17

FOREIGN PATENT DOCUMENTS

| JP | 4-65066 | 3/1992 |
| JP | 2004-192824 A1 | 7/2004 |
| JP | 2005-35967 A1 | 2/2005 |
| JP | 2006-24418 A1 | 1/2006 |

* cited by examiner

Primary Examiner — Karie O'Neill Apicella
(74) Attorney, Agent, or Firm — Kratz, Quintos & Hanson, LLP

(57) ABSTRACT

A fuel cell system includes a fuel cell configured to generate electric power with a fuel gas and an oxygen gas fed to the fuel cell and to discharge exhaust gas including $CO_2$ as a result of generating the electric power; a CO extraction part configured to reduce the $CO_2$ in the exhaust gas fed to the CO extraction part to CO, the CO extraction part including a processing container fed with the exhaust gas and a $CO_2$ adsorbing member provided in the processing container and formed of an oxide having an oxygen deficiency; and a CO recycling part configured to feed the extracted CO to the fuel cell as part of the fuel gas.

9 Claims, 14 Drawing Sheets

FUEL CELL SYSTEM AND METHOD OF CONTROLLING SAME

CROSS-REFERENCE TO RELATED APPLICATIONS

The present application is based upon and claims the benefit of priority of the prior Japanese Patent Application No. 2009-063182, filed on Mar. 16, 2009, and the Japanese Patent Application No. 2009-277796, filed on Dec. 7, 2009, the entire contents of which are incorporated herein by reference.

FIELD

A certain aspect of the embodiments discussed herein is related to a fuel cell.

BACKGROUND

In these years, fuel cells have drawn attention as a technology for the prevention of global warming. Unlike heat engines, fuel cells are believed to be able to convert chemical energy directly into electrical energy, achieve high electric power generation efficiency, and reduce energy consumption.

Solid oxide fuel cells (SOFCs) and molten carbonate fuel cells (MCFCs) are known as fuel cells capable of generating electrical power on a large scale. These fuel cells have high reaction temperatures, but may use natural gas, coal gas, and CO (carbon monoxide) gas in addition to hydrogen gas as fuel.

Therefore, in SOFCs, attempts have been made to employ hydrocarbon gas and CO gas generated from coal and hydrocarbons such as methane ($CH_4$) gas generated by fermenting organic waste as source gases.

On the other hand, such SOFCs or MCFCs have $CO_2$ (carbon dioxide) contained in their exhaust gas. Accordingly, various proposals have been made to improve energy efficiency and reduce $CO_2$ emission in order to prevent global warming due to $CO_2$ emission.

For example, Japanese Laid-open Patent Publication No. 04-065066 proposes reusing $CO_2$ included in exhaust gas by reducing $CO_2$ to a hydrocarbon or alcohol by electrolysis or photoelectrolysis. Japanese Laid-open Patent Publication No. 2004-192824 proposes the technique of reusing $CO_2$ by reducing $CO_2$ to a hydrocarbon such as methane using bacteria such as methanogen.

SUMMARY

According to an aspect of the invention, a fuel cell system includes a fuel cell configured to generate electric power with a fuel gas and an oxygen gas fed thereto and to discharge an exhaust gas including $CO_2$ as a result of generating the electric power; a CO extraction part configured to reduce the $CO_2$ in the exhaust gas fed thereto to CO, the CO extraction part including a processing container fed with the exhaust gas and a $CO_2$ adsorbing member provided in the processing container and formed of an oxide having an oxygen deficiency; and a CO recycling part configured to feed the extracted CO to the fuel cell as a part of the fuel gas.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

BRIEF DESCRIPTION OF THE DRAWING(S)

DESCRIPTION OF EMBODIMENTS

According to the proposal by Japanese Laid-open Patent Publication No. 04-065066, however, $CO_2$ is reduced to the extent of a hydrocarbon by electrolysis so that a large amount of energy is necessary to reduce $CO_2$. Therefore, this is not necessarily effective in reducing the amount of energy consumption in light of energy balance.

Further, the proposal by Japanese Laid-open Patent Publication No. 2004-192824 requires a repository for garbage, a fermentation tank, and/or a gas purifier to reduce $CO_2$. This results in a complicated system configuration and also causes a problem in that special attention is necessary for maintenance of the fermentation tank or the like.

Preferred embodiments of the present invention will be explained with reference to accompanying drawings.

[a] First Embodiment

Figure 1:
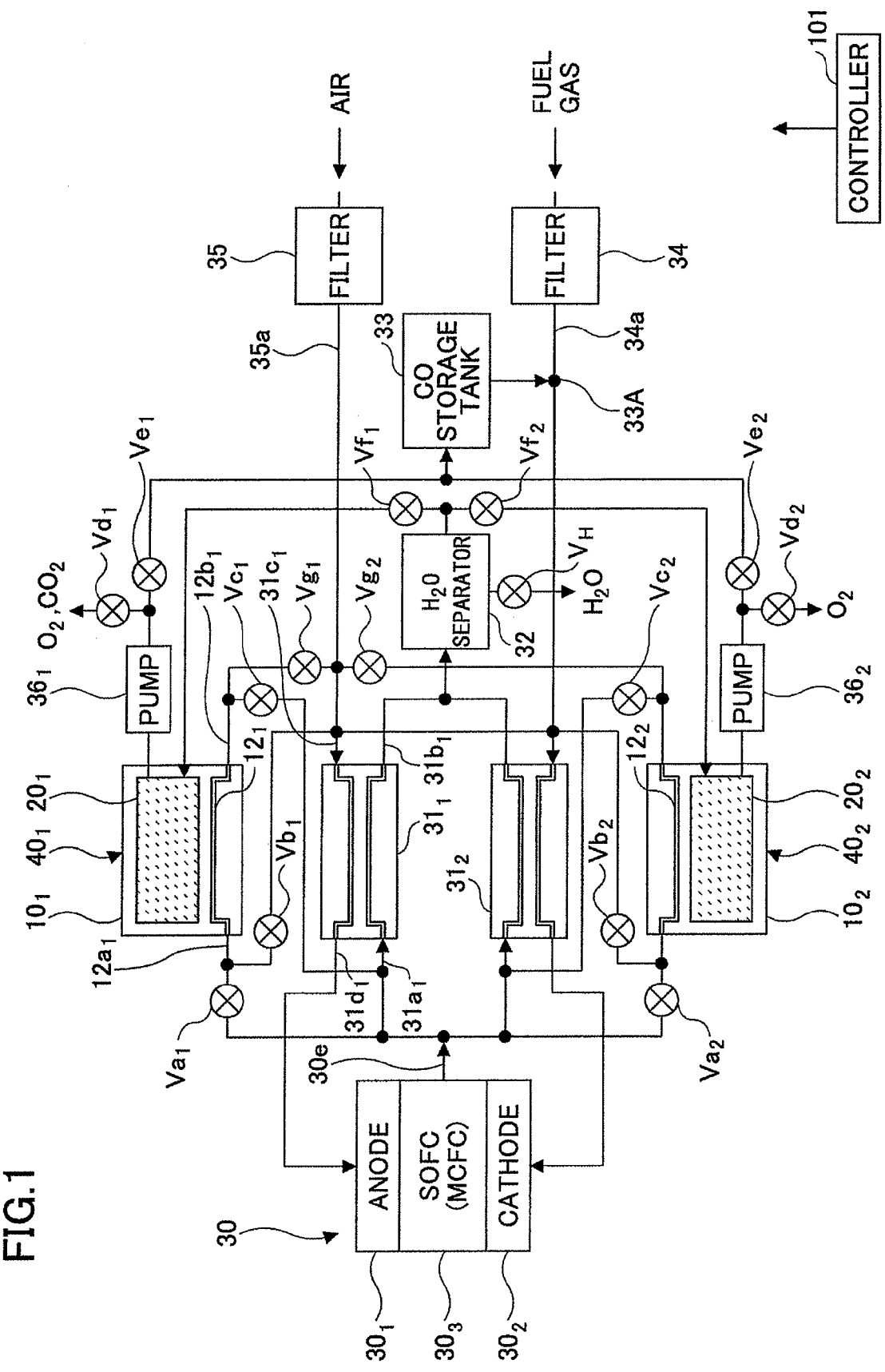
FIG. 1 is a schematic diagram illustrating a fuel cell system according to a first embodiment.

FIG. 1 is a schematic diagram illustrating a fuel cell system 100 according to a first embodiment.

Referring to FIG. 1, the fuel cell system 100 includes a fuel cell 30. The fuel cell 30 is a solid oxide fuel cell (SOFC) or a molten carbonate fuel cell (MCFC).

The fuel cell 30 includes an air electrode (anode) $30_1$, a fuel electrode (cathode) $30_2$, and an electrolyte $30_3$ held (sandwiched) between the air electrode $30_1$ and the fuel electrode $30_2$. If the fuel cell 30 is an SOFC, an oxide such as stabilized zirconia is used as the electrolyte $30_3$. If the fuel cell 30 is an MCFC, a fused salt of a lithium carbonate or sodium carbonate is used as the electrolyte $30_3$. In practice, it is often the case that multiple cells each having the electrolyte $30_3$ held between the air electrode $30_1$ and the fuel electrode $30_2$ are stacked through separators (not graphically illustrated) and used as a fuel cell.

The fuel cell 30 generates electric power by having the air electrode $30_1$ fed with an oxidation gas such as air through a filter 35 and an air line 35a and having the fuel electrode $30_2$ fed with fuel such as natural gas or petroleum gas through a filter 34 and a fuel line 34a.

In the fuel cell 30, in the case of feeding methane $CH_4$ as a fuel gas and feeding air as an oxidation gas, the following reaction with oxygen in the air occurs so that electric power is generated:

$$CH_4 + 2O_2 \rightarrow CO_2 + 2H_2O. \quad (1)$$

In the case of using an SOFC as the fuel cell 30, generally, this reaction is caused to occur at a high temperature of 800° C. to 1000° C. Further, in the case of using an MCFC as the fuel cell 30, this reaction is also caused to occur at a high temperature of 600° C. to 700° C.

On the other hand, in the SOFC or MCFC, carbon monoxide (CO) may also be used as fuel. In this case, desired power generation is performed by the following reaction with oxygen in the air:

$$CO + 1/2O_2 \rightarrow CO_2. \quad (2)$$

In this case also, the power generation reaction is caused to occur at as high temperatures as described above. The above-described reactions (equations) (1) and (2) may be caused to occur simultaneously.

As is seen from the above-described equations, in the SOFC or MCFC, $CO_2$ is generated as a reaction product with use of natural gas, petroleum gas, or a gas containing carbon, such as carbon monoxide. The generated $CO_2$ is discharged from the fuel cell 30 in the form of high-temperature exhaust gas.

The generated high-temperature exhaust gas has energy. Therefore, the fuel cell system 100 of FIG. 1 has a heat exchanger $31_1$ and a heat exchanger $31_2$ provided in the air line 35a and the fuel line 34a, respectively, and feeding the high-temperature exhaust gas to the heat exchanger $31_1$ and the heat exchanger $31_2$, thereby heating the air fed through the air line 35a and the fuel gas fed through the fuel line 34a before the air and the fuel gas are injected into the fuel cell 30.

The exhaust gas cooled through the heat exchangers $31_1$ and $31_2$ is led to an $H_2O$ separator 32 such as a cold trap, where water is separated. The $H_2O$ separator 32 is provided with a valve $V_H$, which is periodically opened to discharge the separated water outside the fuel cell system 100.

Further, the fuel cell system 100 of FIG. 1 includes a CO extraction part that extracts CO gas from the exhaust gas composed principally of high-temperature $CO_2$ discharged from the fuel cell 30. The CO extraction part reuses the CO gas thus extracted as fuel. As a result, the fuel cell system 100 of FIG. 1 achieves high energy efficiency.

A description is given below of the CO extraction part of the fuel cell system 100.

Referring to FIG. 1, the CO extraction part includes $CO_2$ adsorption and decomposition tanks $40_1$ and $40_2$ fed with the exhaust gas of the fuel cell 30. The exhaust gas from which $H_2O$ has been separated in the $H_2O$ separator 32 is fed to the $CO_2$ adsorption and decomposition tanks $40_1$ and $40_2$ through a valve $Vf_1$ and a valve $Vf_2$, respectively.

The $CO_2$ adsorption and decomposition tanks $40_1$ and $40_2$ extract carbon monoxide (CO) from $CO_2$ in the exhaust gas. The CO gas thus extracted is collected and stored in a CO storage tank 33 through a pump $36_1$ and a valve $Ve_1$ and through a pump $36_2$ and a valve $Ve_2$. The CO gas collected into the CO storage tank 33 is injected as additional fuel into the fuel gas fed to the fuel cell 30 through the filter 34 at an injection part 33A provided in the fuel line 34a, and is thus recycled.

Figure 2:
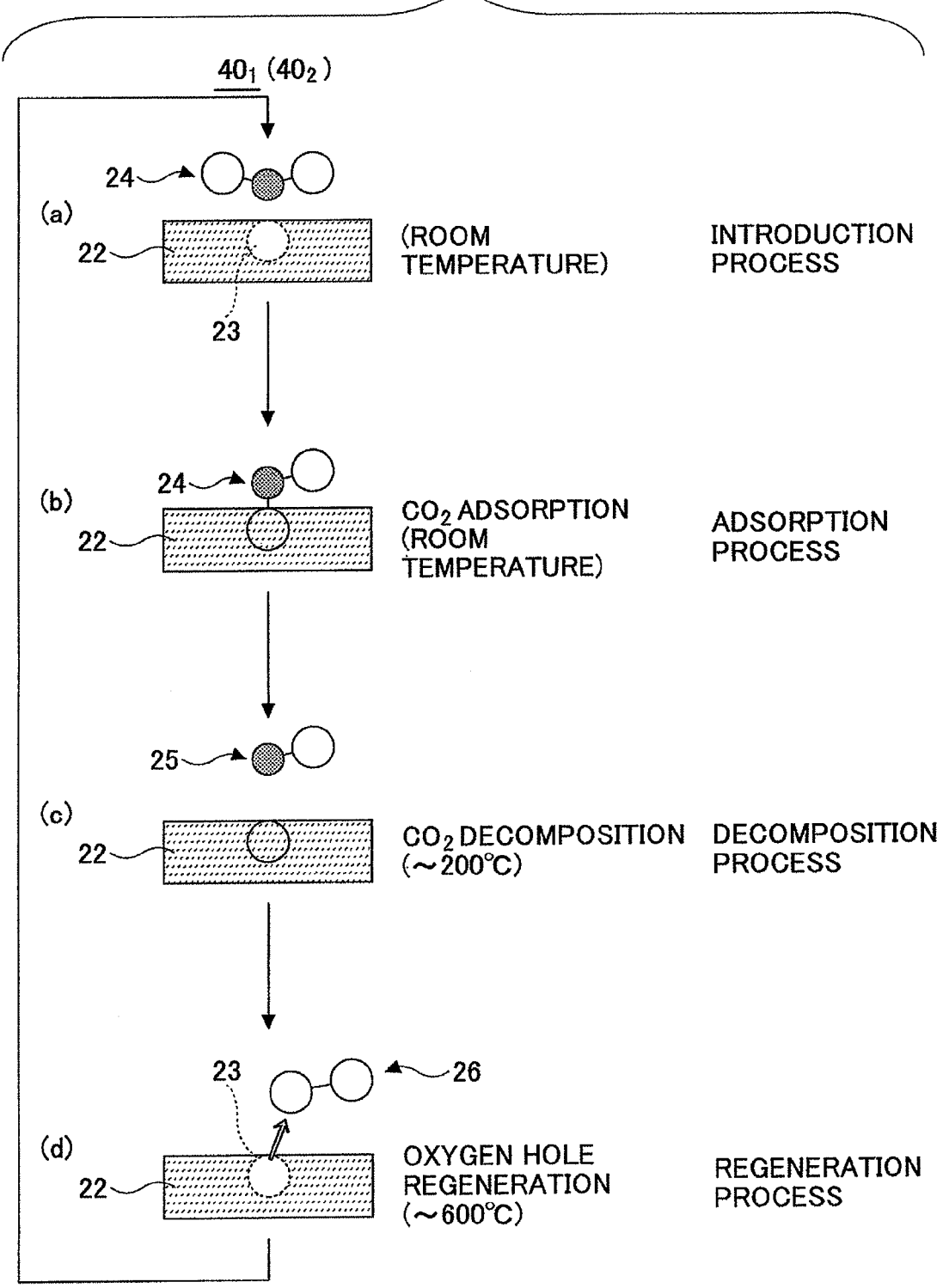
FIG. 2 is a flowchart illustrating a $CO_2$ adsorption and decomposition cycle in the fuel cell system of FIG. 1 according to the first embodiment.
Figure 3:
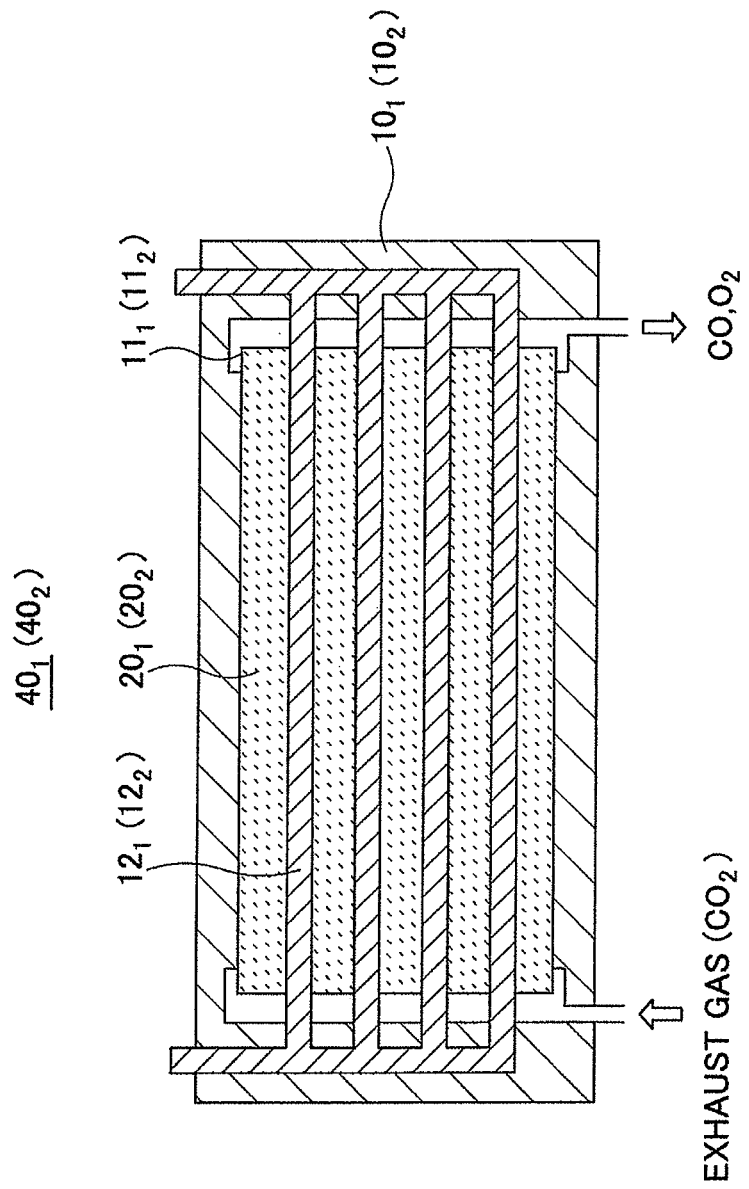
FIG. 3 is a diagram illustrating a $CO_2$ adsorption and decomposition tank in the fuel cell system of FIG. 1 according to the first embodiment.
Figure 4:
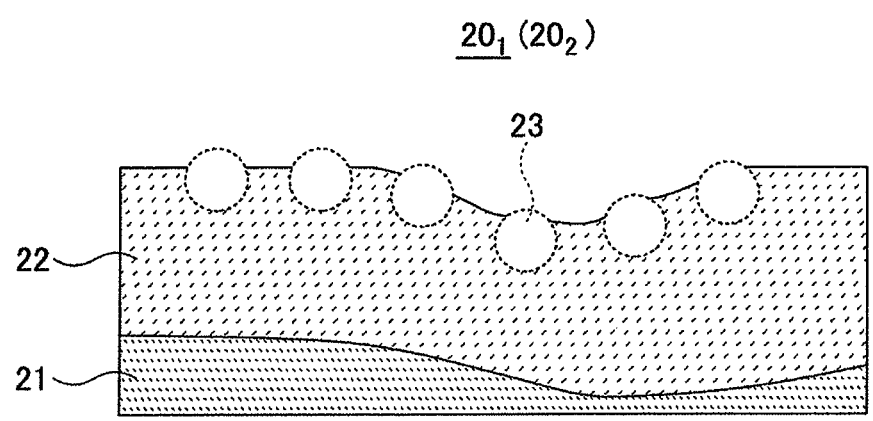
FIG. 4 is an enlarged view of a $CO_2$ adsorbing member used in the $CO_2$ adsorption and decomposition tank of FIG. 3 according to the first embodiment.

FIG. 2 is a flowchart illustrating an overview of a $CO_2$ adsorption and decomposition cycle in the $CO_2$ adsorption and decomposition tanks $40_1$ and $40_2$. FIG. 3 is a diagram illustrating a configuration of the $CO_2$ adsorption and decomposition tank $40_1$. FIG. 4 is an enlarged view of a $CO_2$ adsorbing member $20_1$ of the $CO_2$ adsorption and decomposition tank $40_1$. The $CO_2$ adsorption and decomposition tank $40_2$ has the same configuration as the $CO_2$ adsorption and decomposition tank $40_2$. Accordingly, a description of the $CO_2$ adsorption and decomposition tank $40_2$ is omitted.

First, referring to FIG. 3, the $CO_2$ adsorption and decomposition tank $40_1$ includes a container $10_1$ of, for example, stainless steel, copper, or a nickel alloy and has the $CO_2$ adsorbing member $20_1$ contained in the processing space of the container $10_1$. Further, the $CO_2$ adsorption and decomposition tank $40_1$ has an exhaust gas feed part $11_1$ formed in the container $10_1$. The exhaust gas feed part $11_1$ is formed of a passage for feeding the exhaust gas from the fuel cell 30 to the $CO_2$ adsorbing member $20_1$. Further, the $CO_2$ adsorption and decomposition tank $40_1$ includes a heat exchanger $12_1$. The heat exchanger $12_1$ heats the $CO_2$ adsorbing member $20_1$ to a predetermined temperature with the exhaust gas from the fuel cell 30.

The $CO_2$ adsorbing member $20_1$ adsorbs $CO_2$ molecules in the fed exhaust gas, and decomposes them into carbon monoxide molecules and oxygen atoms. That is, in the $CO_2$ adsorbing member $20_1$, the decomposition and reduction reaction expressed by the following equation occurs:

$$CO_2 \rightarrow CO + 1/2O_2. \quad (3)$$

Likewise, the $CO_2$ adsorption and decomposition tank $40_2$ includes a container $10_2$ of, for example, stainless steel, copper, or a nickel alloy and has a $CO_2$ adsorbing member $20_2$ contained in the processing space of the container $10_2$. Further, the $CO_2$ adsorption and decomposition tank $40_2$ has an exhaust gas feed part $11_2$ formed in the container $10_2$. The exhaust gas feed part $11_2$ is formed of a passage for feeding the exhaust gas from the fuel cell 30 to the $CO_2$ adsorbing member $20_2$. Further, the $CO_2$ adsorption and decomposition tank $40_2$ includes a heat exchanger $12_2$. The heat exchanger $12_2$ heats the $CO_2$ adsorbing member $20_2$ to a predetermined temperature with the exhaust gas from the fuel cell 30.

The $CO_2$ adsorbing member $20_2$ adsorbs $CO_2$ molecules in the fed exhaust gas, and decomposes them into carbon monoxide molecules and oxygen atoms. That is, the decomposition and reduction reaction expressed by Eq. (3) described above ($CO_2 \rightarrow CO + 1/2O_2$) occurs in the $CO_2$ adsorbing member $20_1$ as well.

In the configuration illustrated in FIG. 3, $CO_2$ adsorbing member $20_1$ may be formed of multiple flat plate-shaped members stacked in layers at predetermined intervals or be a cylindrical member as described below or a prism-shaped member. The same applies to the $CO_2$ adsorbing member $20_2$.

FIG. 4 illustrates a detailed configuration of the $CO_2$ adsorbing member $20_1$. A description of the $CO_2$ adsorbing member $20_2$, which has the same configuration of the $CO_2$ adsorbing member $20_1$, is omitted.

Referring to FIG. 4, the $CO_2$ adsorbing member $20_1$ includes a base 21 and a $CO_2$ adsorbent 22 of, for example, 1 nm to 1 μm in film thickness formed on the base 21. The base 21 is preferably a porous body and has a large surface area.

The $CO_2$ adsorbent 22 is a metal oxide film that has oxygen deficiencies 23 and preferably has a perovskite structure such as $SrTiO_3$ or PZT. For example, in the case where the $CO_2$ adsorbent 22 is formed of $SrTiO_3$, the $CO_2$ adsorbent 22 generally has a nonstoichiometric composition expressed by a chemical formula of $Sr_{1-x}Ti_{1-y}O_{3-z}$, while in the application to the fuel cell system 100 of FIG. 1, it is preferable that the composition parameter z be more than or equal to 0.1 to include a large number of oxygen deficiencies in particular. Further, in addition to $SrTiO_3$ and PZT, examples of the $CO_2$ adsorbent 22 may include other metal oxides having the perovskite structure, such as $BaTiO_3$, $BaSrTiO_3$, $CaTiO_3$, and $CaMnO_3$. Further, fired porous silica or diatomaceous earth may be used as the base 21.

Here, referring to the flowchart of FIG. 2, in a process of (a), the exhaust gas containing a $CO_2$ molecule 24 is fed into the containers $10_1$ and $10_2$ forming the $CO_2$ adsorption and decomposition tank $40_1$ and the $CO_2$ adsorption and decomposition tank $40_2$, respectively. In the following, a description is given of the $CO_2$ adsorption and decomposition tank $40_1$, and a description of the $CO_2$ adsorption and decomposition tank $40_2$, which is the same as the description of the $CO_2$ adsorption and decomposition tank $40_1$, is omitted.

Then, as illustrated in a process of (b) of FIG. 2, one of the oxygen atoms of the $CO_2$ molecule 24 is captured with (due to) the oxygen deficiency 23. That is, in the process of (b), the $CO_2$ molecule 24 is adsorbed by the $CO_2$ adsorbent 22.

In the processes of (a) and (b) of FIG. 2, the $CO_2$ adsorbent 22 is set at room temperature by feeding air to the heat exchanger $12_1$. The process of (b), however, may be executed at any temperature between room temperature and 100° C. Hereinafter, the process of (a) may be referred to as an "introduction process," and the process of (b) may be referred to as an "adsorption process."

The pumps $36_1$ and $36_2$ (FIG. 1) are provided for the $CO_2$ adsorption and decomposition tanks $40_1$ and $40_2$, respectively, for introduction of the exhaust gas and for other processes described below. For example, in the introduction process of FIG. 2, the pump $36_1$ is driven to evacuate the container $10_1$ of the $CO_2$ adsorption and decomposition tank $40_1$, so that the exhaust gas that has passed through the $H_2O$ separator 32 is introduced into the $CO_2$ adsorption and decomposition tank $40_1$.

Next, in a process of (c) of FIG. 2, the temperature of the $CO_2$ adsorbent 22 is increased to 200° C. to 300° C., and the pressure of the processing space in which the $CO_2$ adsorbent 22 is provided is reduced to approximately 0.01 atm. to approximately 0.1 atm. using the pump $36_1$. As a result, the $CO_2$ molecule 24 is decomposed into the oxygen atom captured due to the oxygen deficiency 23 and a CO molecule 25, so that CO is liberated from $CO_2$. That is, $CO_2$ is reduced to CO, so that CO is extracted from $CO_2$. The CO gas thus extracted is collected into the CO storage tank 33 as described above. For example, the pump $36_1$ is driven to send the extracted CO gas from the container $10_1$ of the $CO_2$ adsorption and decomposition tank $40_1$ to the CO storage tank 33, so that the extracted CO gas is collected into the CO storage tank 33. Hereinafter, the process of (c) may be referred to as a "decomposition process."

In the decomposition process, the $CO_2$ adsorbent 22 of the $CO_2$ adsorption and decomposition tank $40_1$ is adjusted to the above-described temperature of 200° C. to 300° C. by feeding the high-temperature exhaust gas from the fuel cell 30 to the heat exchanger $12_1$ while controlling the flow rate of the high-temperature exhaust gas. If the fuel cell 30 is an SOFC, the high-temperature exhaust gas has a temperature of approximately 800° C. If the fuel cell 30 is an MCFC, the high-temperature exhaust gas has a temperature of approximately 700° C.

Further, when substantially all of the $CO_2$ molecules 24 adsorbed by the $CO_2$ adsorbent 22 are decomposed, in a process of (d) of FIG. 2, the container $10_1$ is evacuated by the pump $36_1$, and the $CO_2$ adsorbent 22 is heated to preferably the temperature of the high-temperature exhaust gas or a slightly lower temperature of 600° C. to 700° C. As a result, the oxygen atom captured due to the oxygen deficiency 23 (as well as other oxygen atoms captured with the oxygen deficiencies 23) is released to be removed from the $CO_2$ adsorption and decomposition tank $40_1$ in the form of an oxygen molecule ($O_2$) 26. Hereinafter, the process of (d) may be referred to as a "regeneration process."

In the regeneration process, the $CO_2$ adsorbent 22 of the $CO_2$ adsorption and decomposition tank $40_1$ may be heated to the above-describe temperature of 600° C. to 700° C. by feeding the high-temperature exhaust gas from the fuel cell 30 to the heat exchanger $12_1$ at a maximum flow rate.

Then, the processing returns to the process of (a) and the above-described processes (a) through (d) are repeated. Thereby, CO is repeatedly extracted from $CO_2$ in the exhaust gas of the fuel cell 30 to be reused as fuel. As a result, it is possible to significantly improve the energy balance of the fuel cell 30.

Likewise, the same "introduction process," "adsorption process," "decomposition process," and "regeneration process" are also executed in the $CO_2$ adsorption and decomposition tank $40_2$, although their description is omitted. It is preferable that the $CO_2$ adsorption and decomposition tanks $40_1$ and $40_2$ be caused to operate alternately in the fuel cell system 100 of FIG. 1.

Figure 5:
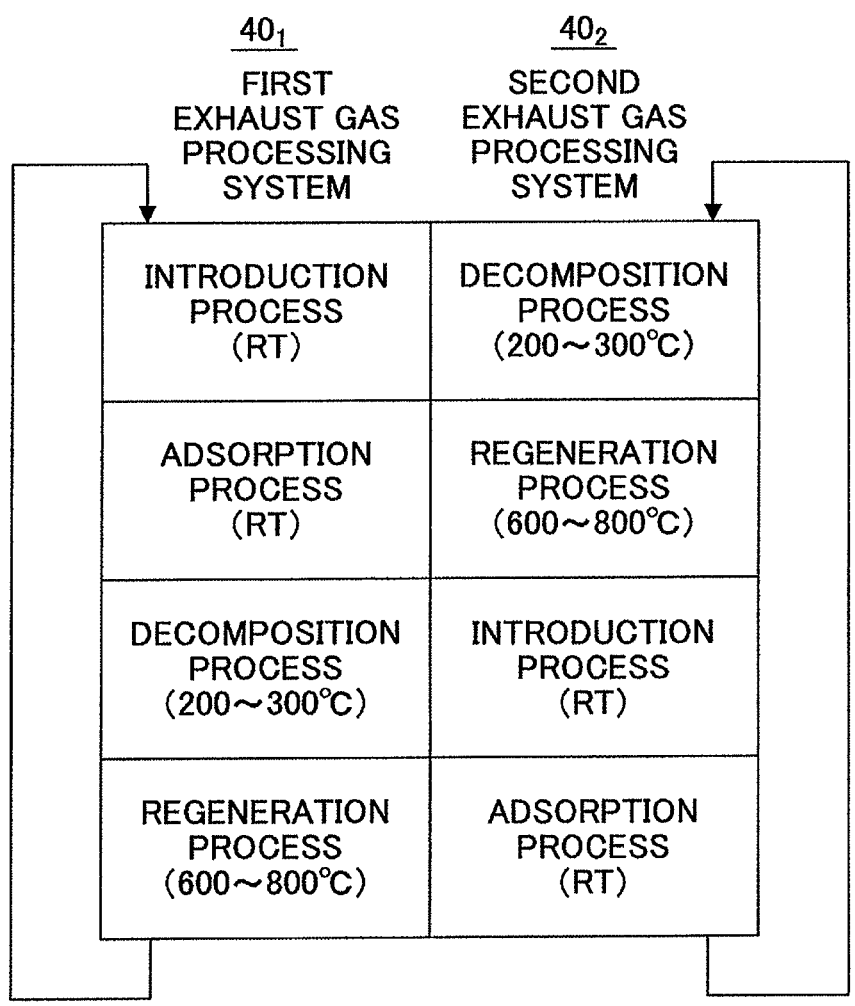
FIG. 5 is a timing chart of operations of a first exhaust gas processing system and a second exhaust gas processing system in the fuel cell system of FIG. 1 according to the first embodiment.

That is, as illustrated in the flowchart of FIG. 5, while the $CO_2$ adsorption and decomposition tank $40_1$ is caused to operate at room temperature (RT) so as to execute the introduction process and the adsorption process that do not require feeding of the high-temperature exhaust gas of the fuel cell 30 to the heat exchanger $12_1$, the decomposition process and the regeneration process are executed in the $CO_2$ adsorption and decomposition tank $40_2$ with feeding of the high-temperature exhaust gas of the fuel cell 30 to the heat exchanger $12_2$. On the other hand, while the $CO_2$ adsorption and decomposition tank $40_2$ is caused to operate at room temperature (RT) so as to execute the introduction process and the adsorption process that do not require feeding of the high-temperature exhaust gas of the fuel cell 30 to the heat exchanger $12_2$, the decomposition process and the regeneration process are executed in the $CO_2$ adsorption and decomposition tank $40_1$ with feeding of the high-temperature exhaust gas of the fuel cell 30 to the heat exchanger $12_1$.

By thus causing the $CO_2$ adsorption and decomposition tanks $40_1$ and $40_2$ to operate alternately, it is possible to make efficient use of the heat of the high-temperature exhaust gas discharged from the fuel cell 30, so that it is possible to execute the decomposition process and the regeneration process with high energy efficiency without using external energy or generated electric power.

Therefore, the fuel cell system 100 of FIG. 1 has valves $Va_1$ through $Vd_1$ and $Vg_1$ and the valves $Ve_1$ and $Vf_1$ provided in a first exhaust gas processing system including the $CO_2$ adsorption and decomposition tank $40_1$, and has valves $Va_2$ through $Vd_2$ and $Vg_2$ and the valves $Ve_2$ and $Vf_2$ provided in a second exhaust gas processing system including the $CO_2$ adsorption and decomposition tank $40_2$.

A description is given below, with reference to FIG. 1, of the valves $Va_1$ through $Vg_1$.

The valve $Va_1$ is provided between an exhaust opening $30e$ of the fuel cell 30 and an inlet/outlet port $12a_1$ of the heat exchanger $12_1$ of the $CO_2$ adsorption and decomposition tank $40_1$. Correspondingly, on the opposite side of the heat exchanger $12_1$, the valve $Vc_1$ for feeding the exhaust gas that has passed through the heat exchanger $12_1$ to an exhaust gas inlet port $31a_1$ of the heat exchanger $31_1$ is provided for an outlet/inlet port $12b_1$ of the heat exchanger $12_1$. The exhaust gas of the fuel cell 30 is also fed directly from the exhaust port $30e$ to the exhaust gas inlet port $31a_1$ of the heat exchanger $31_1$.

Further, in the $CO_2$ adsorption and decomposition tank $40_1$, the valve $Vg_1$ for feeding the air in the air line $35a$ to the heat exchanger $12_1$ is provided between the air line $35a$ and the outlet/inlet port $12b_1$ of the heat exchanger $12_1$. Further, the valve $Vb_1$ for feeding the air that has passed through the heat exchanger $12_1$ to an air inlet port $31c_1$ of the heat exchanger $31_1$ is provided for the inlet/outlet port $12a_1$ of the heat exchanger $12_1$. The air inlet port $31c_1$ is connected to the air line $35a$ so that air is fed to the air inlet port $31c_1$.

When the valves $Va_1$ and $Vc_1$ are opened, part of the exhaust gas discharged from the exhaust port $30e$ of the fuel cell 30 passes through the heat exchanger $12_1$ of the $CO_2$ adsorption and decomposition tank $40_1$ to be fed to the exhaust gas inlet port $31a_1$ of the heat exchanger $31_1$ and added to the exhaust gas fed directly from the exhaust port $30e$ to the exhaust gas inlet port $31a_1$.

Further, the valves $Vg_1$ and $Vb_1$ are opened to cause the air in the air line $35a$ to be fed to air inlet port $31c_1$ through the heat exchanger $12_1$. Then, after being heated, the air is fed from an air outlet port $31d_1$ on the opposite side of the heat exchanger $31_1$ to the air electrode $30_1$ of the fuel cell 30. At this point, in the $CO_2$ adsorption and decomposition tank $40_1$, the temperature of the $CO_2$ adsorbing member $20_1$ is set at room temperature.

Further, according to the fuel cell system 100 of FIG. 1, the exhaust gas is fed from an exhaust gas outlet port $31b_1$ of the heat exchanger $31_1$ to the $H_2O$ separator 32 formed of a cold trap, where water is separated. Thereafter, as described above, the exhaust gas is fed to the $CO_2$ adsorption and decomposition tank $40_1$ through the valve $Vf_1$. In the $CO_2$ adsorption and decomposition tank $40_1$, the exhaust gas is fed to the exhaust gas feed part $11_1$ provided to the $CO_2$ adsorbing member $20_1$.

Further, the CO gas extracted in the $CO_2$ adsorption and decomposition tank $40_1$ in the above-described decomposition process ((c) of FIG. 2) is fed to the CO storage tank 33 through the pump $36_1$ and the valve $Ve_1$, and is collected and stored in the CO storage tank 33.

Further, the $O_2$ gas released in the $CO_2$ adsorption and decomposition tank $40_1$ in the above-described regeneration process ((d) of FIG. 2) is discharged outside the fuel cell system 100 through the pump $36_1$ and the valve $Vd_1$.

Likewise, the valves $Va_2$ through $Vg_2$ are provided in the second exhaust gas processing system including the $CO_2$ adsorption and decomposition tank $40_2$ in the fuel cell system 100.

The valves $Va_2$ through $Vg_2$ correspond to the valves $Va_1$ through $Vg_1$, respectively, and accordingly, a description thereof is omitted.

Tables 1 through 4 below illustrate an opening and closing sequence of the valves $Va_1$ through $Vg_1$ and the valves $Va_2$ through $Vg_2$ corresponding to the flowchart of FIG. 5. The following opening and closing sequence of the valves $Va_1$ through $Vg_1$ and the valves $Va_2$ through $Vg_2$ is controlled by a controller 101 schematically illustrated in FIG. 1. It is preferable that the controller 101 be implemented by a computer loaded with a control program.

TABLE 1

[$CO_2$ Adsorption and Decomposition Tank $40_1$: Introduction Process, $CO_2$ Adsorption and Decomposition Tank $40_2$: Decomposition Process]

| $Va_1$ | $Vb_1$ | $Vc_1$ | $Vd_1$ | $Ve_1$ | $Vf_1$ | $Vg_1$ |
|---|---|---|---|---|---|---|
| CLOSED | OPEN | CLOSED | OPEN | CLOSED | OPEN | OPEN |

| $Va_2$ | $Vb_2$ | $Vc_2$ | $Vd_2$ | $Ve_2$ | $Vf_2$ | $Vg_2$ |
|---|---|---|---|---|---|---|
| OPEN | CLOSED | OPEN | CLOSED | OPEN | CLOSED | CLOSED |

TABLE 2

[$CO_2$ Adsorption and Decomposition Tank $40_1$: Adsorption Process, $CO_2$ Adsorption and Decomposition Tank $40_2$: Regeneration Process]

| $Va_1$ | $Vb_1$ | $Vc_1$ | $Vd_1$ | $Ve_1$ | $Vf_1$ | $Vg_1$ |
|---|---|---|---|---|---|---|
| CLOSED | OPEN | CLOSED | CLOSED | CLOSED | CLOSED | OPEN |

| $Va_2$ | $Vb_2$ | $Vc_2$ | $Vd_2$ | $Ve_2$ | $Vf_2$ | $Vg_2$ |
|---|---|---|---|---|---|---|
| OPEN | CLOSED | OPEN | OPEN | CLOSED | CLOSED | CLOSED |

TABLE 3

[$CO_2$ Adsorption and Decomposition
Tank $40_1$: Decomposition Process, $CO_2$ Adsorption and
Decomposition Tank $40_2$: Introduction Process]

| $Va_1$ | $Vb_1$ | $Vc_1$ | $Vd_1$ | $Ve_1$ | $Vf_1$ | $Vg_1$ |
|---|---|---|---|---|---|---|
| OPEN | CLOSED | OPEN | CLOSED | OPEN | CLOSED | CLOSED |
| $Va_2$ | $Vb_2$ | $Vc_2$ | $Vd_2$ | $Ve_2$ | $Vf_2$ | $Vg_2$ |
| CLOSED | OPEN | CLOSED | OPEN | CLOSED | OPEN | OPEN |

TABLE 4

[$CO_2$ Adsorption and Decomposition
Tank $40_1$: Regeneration Process, $CO_2$ Adsorption and
Decomposition Tank $40_2$: Adsorption Process]

| $Va_1$ | $Vb_1$ | $Vc_1$ | $Vd_1$ | $Ve_1$ | $Vf_1$ | $Vg_1$ |
|---|---|---|---|---|---|---|
| OPEN | CLOSED | OPEN | OPEN | CLOSED | CLOSED | CLOSED |
| $Va_2$ | $Vb_2$ | $Vc_2$ | $Vd_2$ | $Ve_2$ | $Vf_2$ | $Vg_2$ |
| CLOSED | OPEN | CLOSED | CLOSED | CLOSED | CLOSED | OPEN |

Referring to Table 1, in the introduction process of the $CO_2$ adsorption and decomposition tank $40_1$, the valves $Vb_1$ and $Vg_1$ are open with the valves $Va_1$, $Vc_1$, and $Ve_1$ being closed. As a result, the air in the air line 35a is fed to the heat exchanger $12_1$ of the $CO_2$ adsorption and decomposition tank $40_1$, so that the temperature of the $CO_2$ adsorbing member $20_1$ is set at room temperature. In this state, the valve $Vd_1$ is opened and the pump $36_1$ is driven so as to evacuate the container $10_1$ in the $CO_2$ adsorption and decomposition tank $40_1$ so that the pressure inside the container $10_1$ (the processing space) is reduced to approximately 0.01 atm. to approximately 0.1 atm. In this state, the valve $Vf_1$ is opened to allow the exhaust gas that has passed through the $H_2O$ separator 32 to flow into the container $10_1$ and fill in the $CO_2$ adsorption and decomposition tank $40_1$.

Next, in the adsorption process of the $CO_2$ adsorption and decomposition tank $40_1$, the valves $Va_1$, $Vc_1$, and $Ve_1$ are kept closed while the valves $Vb_1$ and $Vg_1$ remain open, so that the air in the air line 35a continues to be fed to the heat exchanger $12_1$ of the $CO_2$ adsorption and decomposition tank $40_1$ and the temperature of the $CO_2$ adsorbing member $20_1$ is kept at room temperature. Further, in this state, the valves $Vd_1$ and $Vf_1$ are closed, and the $CO_2$ gas introduced into the container $10_1$ is adsorbed by the $CO_2$ adsorbent 22 of the $CO_2$ adsorbing member $20_1$.

Next, in the decomposition process of the $CO_2$ adsorption and decomposition tank $40_1$, the valves $Va_1$ and $Vc_1$ are open while the valves $Vb_1$ and $Vg_1$ are closed. As a result, the exhaust gas of the fuel cell 30 is introduced into the heat exchanger $12_1$, so that the temperature of the $CO_2$ adsorbing member $20_1$ is set at 200° C. to 300° C. In this state, while keeping the valves $Vd_1$ and $Vf_1$ closed, the valve $Ve_1$ is opened and the pump $36_1$ is driven, so that the CO gas extracted in the $CO_2$ adsorption and decomposition tank $40_1$ is fed to the CO storage tank 33. In the decomposition process, the temperature of the $CO_2$ adsorbing member $20_1$ may be set at 200° C. to 300° C. by controlling the degree of opening of the valves $Va_1$ and $Vc_1$.

Next, in the regeneration process of the $CO_2$ adsorption and decomposition tank $40_1$, while keeping the valves $Va_1$ and $Vc_1$ open and keeping the valves $Vb_1$, $Vf_1$, and $Vg_1$ closed, the valve $Ve_1$ is closed and the valve $Vd_1$ is opened. Further, the pump $36_1$ is driven to reduce the pressure of the processing space in the container $10_1$ to approximately 0.01 atm. to approximately 0.1 atm. As a result, the oxygen atoms adsorbed to the $CO_2$ adsorbing member $20_1$ are released into the processing space to be released outside the fuel cell system 100 as oxygen gas. As a result, the $CO_2$ adsorbing member $20_1$ is regenerated in the $CO_2$ adsorption and decomposition tank $40_1$. The oxygen gas thus produced may be returned to the air line 35a to be re-supplied to the air electrode $30_1$ of the fuel cell 30 instead of being discharged outside the fuel cell system 100.

Referring to Table 1, during the introduction process in the $CO_2$ adsorption and decomposition tank $40_1$, the decomposition process is executed to decompose $CO_2$ in the $CO_2$ adsorption and decomposition tank $40_2$ with the valves $Vb_2$, $Vd_2$, $Vf_2$, and $Vg_2$ being closed and the valves $Va_2$, $Vc_2$, and $Ve_2$ being open.

Referring to Table 2, during the adsorption process in the $CO_2$ adsorption and decomposition tank $40_1$, the regeneration process is executed to regenerate the $CO_2$ adsorbing member $20_2$ in the $CO_2$ adsorption and decomposition tank $40_2$ with the valves $Vb_2$, $Ve_2$, $Vf_2$, and $Vg_2$ being closed and the valves $Va_2$, $Vc_2$, and $Vd_2$ being open.

Referring to Table 3, during the decomposition process in the $CO_2$ adsorption and decomposition tank $40_1$, the introduction process is executed to introduce the exhaust gas that has passed the $H_2O$ separator 32 into the container $10_2$ in the $CO_2$ adsorption and decomposition tank $40_2$ with the valves $Va_2$, $Vc_2$, and $Ve_2$ being closed and the valves $Vb_2$, $Vd_2$, $Vf_2$, and $Vg_2$ being open.

Referring to Table 4, during the regeneration process in the $CO_2$ adsorption and decomposition tank $40_1$, the adsorption process is executed for the $CO_2$ adsorbing member $20_2$ to adsorb $CO_2$ in the $CO_2$ adsorption and decomposition tank $40_2$ with the valves $Va_2$, $Vc_2$, $Vd_2$, $Ve_2$, and $Vf_2$ being closed and the valves $Vb_2$ and $Vg_2$ being open.

Thus, according to this embodiment, a $CO_2$ adsorption and decomposition tank having a simple structure is employed together with a simple heat feeding cycle in order to decompose $CO_2$. As a result, it is possible to construct a fuel cell system having a simple structure and to facilitate the maintenance of the $CO_2$ adsorption and decomposition tanks $40_1$ and $40_2$.

Further, according to this embodiment, high-temperature exhaust gas from an SOFC or an MCFC is used as thermal energy for decomposing $CO_2$ and regenerating oxygen holes. Therefore, no extra heating part is necessary or only a small amount heat may be applied for such purposes. Accordingly, it is possible to achieve high energy balance.

For example, decomposing 1 g of $CO_2$ into CO needs approximately 500 J of energy. According to the fuel cell system 100 of FIG. 1, although the efficiency is reduced because of various losses caused by system integration, it is possible to decompose 1 g of $CO_2$ with approximately 1000 J of energy. Further, according to this embodiment, since the decomposition of $CO_2$ and the regeneration of the $CO_2$ adsorbing members $20_1$ and $20_2$ are thermal reactions, there is no particular necessity for external energy, and waste heat from the fuel cell 30 may be used for the reactions. Accordingly, the fuel cell system 100 of FIG. 1 is significantly higher in efficiency than the conventional method using electrolysis.

Further, according to the fuel cell system 100 of FIG. 1, $CO_2$ in the exhaust gas is reduced not as far as to hydrogen or a hydrocarbon but to CO, which is producible with less conversion energy. In this respect as well, it is possible to improve energy balance. Further, according to the fuel cell system 100 of FIG. 1 of this embodiment, $CO_2$-containing exhaust gas from an SOFC or an MCFC is recycled as part of raw materials. Accordingly, it is possible to construct an SOFC fuel cell system or an MCFC fuel cell system reduced in $CO_2$ emission.

Figure 6:
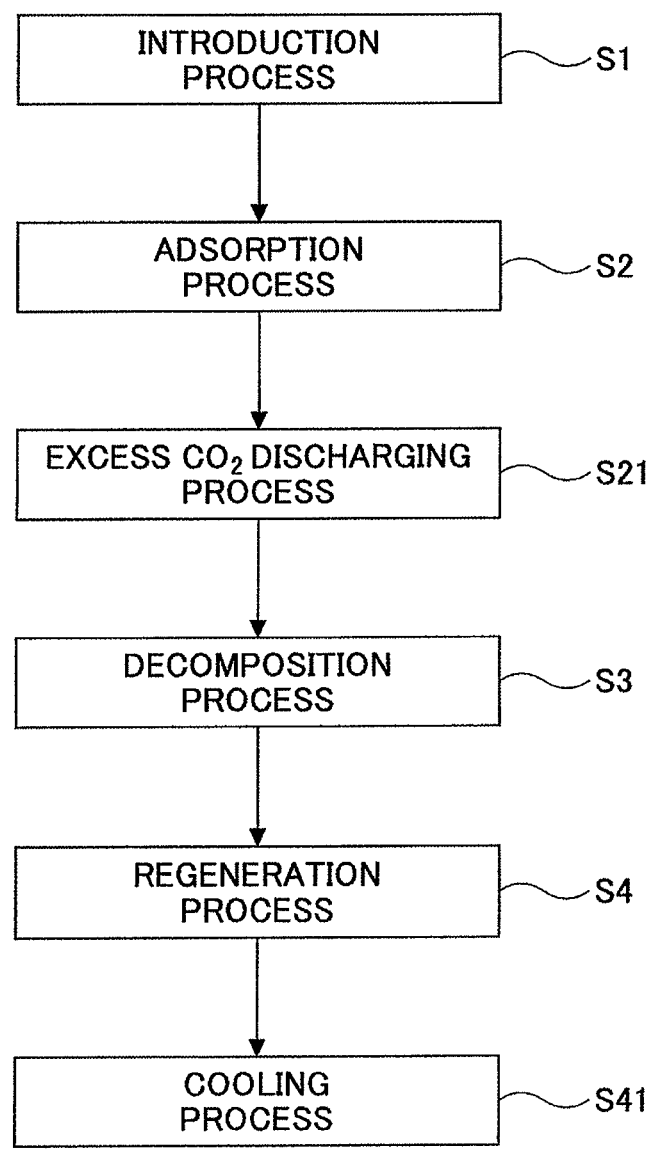
FIG. 6 is a flowchart illustrating an operation of the fuel cell system of FIG. 1 according to the first embodiment.

FIG. 6 is a flowchart illustrating an operation of the fuel cell system 100 of FIG. 1 according to this embodiment.

If the cycle illustrated in FIG. 2 is repeated in the fuel cell system 100 of FIG. 1, practically, the amount of carbon in the fuel cell system 100, and accordingly, the amount of $CO_2$ discharged from the fuel cell 30 gradually increase with a new input of fuel gas. Therefore, the adsorption process of (b) of FIG. 2 does not decompose all $CO_2$ in the exhaust gas with the $CO_2$ adsorbing members $20_1$ and $20_2$. Therefore, in practice, after the introduction process (step S1) and the subsequent adsorption process (step S2), a discharging process (step S21) is preferably performed before proceeding to the decomposition process (step S3) as illustrated in FIG. 6. In the discharging process, excess $CO_2$ is discharged outside the fuel cell system 100 by opening the valves $Vd_1$ and $Vd_2$ and driving the pumps $36_1$ and $36_2$ while keeping the temperature of the $CO_2$ adsorbing members $20_1$ and $20_2$ at room temperature.

When the valve $Vd_1$ is open in the discharge process of step S21, the other valves $Va_1$, $Vb_1$, $Vc_1$, $Ve_1$, $Vf_1$, and $Vg_1$ that cooperate with the $CO_2$ adsorption and decomposition tank $40_1$ are kept closed. Likewise, when the valve $Vd_2$ is open in the discharge process of step S21, the other valves $Va_2$, $Vb_2$, $Vc_2$, $Ve_2$, $Vf_2$, and $Vg_2$ that cooperate with the $CO_2$ adsorption and decomposition tank $40_2$ are kept closed.

The discharge process of step S21 of FIG. 6 may be incorporated into the adsorption process in the timing chart of FIG. 5.

A description is given below in another embodiment of processing the excess $CO_2$ thus discharged.

When the introduction process is entered after the regeneration process, the subsequent adsorption process does not progress normally unless the $CO_2$ adsorbing members $20_1$ and $20_2$ are sufficiently low in temperature, for example, in the range of room temperature to 100° C. It may be possible to wait for the $CO_2$ adsorbing members $20_1$ and $20_2$ to be cooled by natural air cooling. For better operational efficiency of the fuel cell system 100, however, it is preferable to provide a cooling process (step S41) after the regeneration process (step S4) as illustrated in FIG. 6. In the cooling process of step S41, the temperature of the $CO_2$ adsorbing member $20_1$ or $20_2$ may be reduced to a value in the above-described predetermined range by feeding air to the heat exchanger $12_1$ or $12_2$ of the $CO_2$ adsorption and decomposition tank $40_1$ or $40_2$ by closing the valves $Va_1$, $Vc_1$, $Ve_1$, and $Vf_1$ and opening the valves $Vb_1$, $Vd_1$, and $Vg_1$ or closing the valves $Va_2$, $Vc_2$, $Ve_2$, and $Vf_2$ and opening the valves $Vb_2$, $Vd_2$, and $Vg_2$.

The cooling process of step S41 of FIG. 6 may be incorporated into the regeneration process in the timing chart of FIG. 5.

In this embodiment, a description is given of the case of providing the two $CO_2$ adsorption and decomposition tanks $40_1$ and $40_2$. However, the number of $CO_2$ adsorption and decomposition tanks provided is not limited to two, and three or more $CO_2$ adsorption and decomposition tanks may be provided.

[b] Second Embodiment

Figure 7:
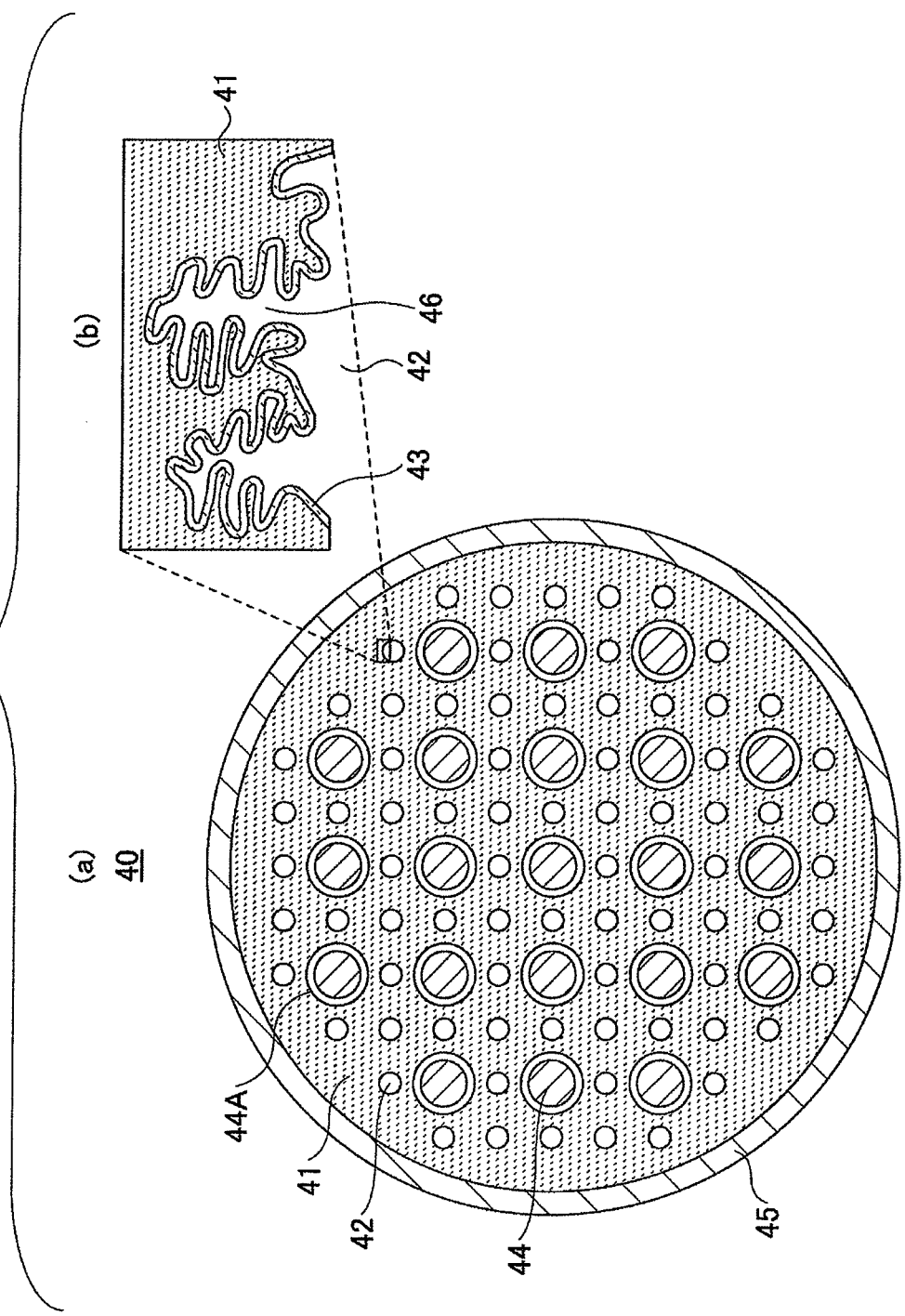
FIG. 7 is a diagram illustrating a $CO_2$ adsorbing member according to a second embodiment.

FIG. 7 is a diagram illustrating a configuration of the $CO_2$ adsorbing member $20_1$ used in the $CO_2$ adsorption and decomposition tank $40_1$ in the fuel cell system 100 of FIG. 1 according to a second embodiment. The configuration of the $CO_2$ adsorbing member $20_2$ used in the $CO_2$ adsorption and decomposition tank $40_2$ in this embodiment may be the same as the configuration of the $CO_2$ adsorbing member $20_1$ illustrated in FIG. 7, and accordingly, a description thereof is omitted.

Referring to (a) of FIG. 7, a $CO_2$ adsorbing member 40 includes a cylindrical porous base body 41 formed by molding and firing porous silica powder and a container 45 of stainless steel or the like that houses the porous base body 41. Multiple exhaust gas passages 42 are formed in the porous base body 41. The exhaust gas passages 42 may be approximately 2 mm in diameter, for example.

As illustrated in an enlarged view of (b) of FIG. 7, multiple recesses 46 such as minute air gaps of approximately several nm to approximately several tens of μm in diameter are formed in the base body 41, and a $SrTiO_3$ film of approximately 1 nm in thickness is formed on the surfaces of the recesses 46 as a $CO_2$ adsorbent layer 43, for example. The $CO_2$ adsorbent layer 43 is preferably a ceramic film formed by a film forming method that provides good step coverage, such as CVD or a sol-gel process, and has a film thickness of approximately 1 nm to approximately 1 μm. If the $CO_2$ adsorbent layer 43 is too thick, the recesses 46 are closed. Accordingly, it is preferable that the $CO_2$ adsorbent layer 43 have a thickness within the above-described range. It is preferable that the recesses 46 illustrated in the enlarged view of (b) of FIG. 7 form successive open pores on the entire surface of the porous base body 41.

Further, multiple gas pipes 44 that operate as the heat exchanger $12_1$ (FIG. 3) are inserted through corresponding openings 44A in the porous base body 41. By causing air from the air line 35a or exhaust gas from the fuel cell 30 (FIG. 1) to flow through the gas pipes 44, the temperature of the $CO_2$ adsorbing member 40 may be controlled to be a predetermined value as described above.

In the $CO_2$ adsorbing member 40 of FIG. 7, the (cylindrical) side surface and the end faces of the porous base body 41 are covered with the container 45.

In addition to the $SrTiO_3$ film mentioned above, examples of the $CO_2$ adsorbent layer 43 may include films of other oxides having the perovskite structure, such as $BaTiO_3$, PZT, and PLZT. These perovskite films are generally polycrystal ceramic films in the case of forming them on the porous base body 41 formed by molding and firing porous silica powder. On the other hand, these perovskite films are monocrystal films in the case of using, for example, a thin monocrystal substrate of $SrTiO_3$ as the porous base body 41.

Figure 8:
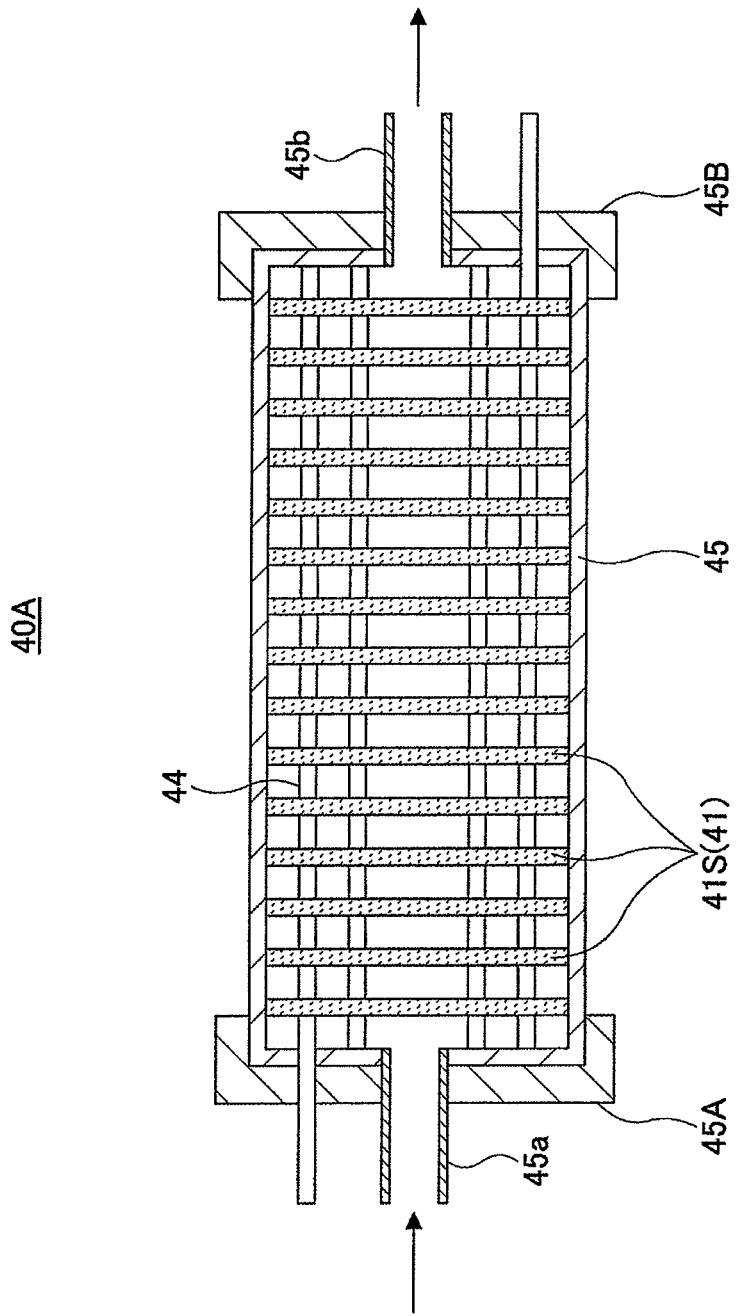
FIG. 8 is a diagram illustrating a $CO_2$ adsorbing member according to a variation of the second embodiment.

FIG. 8 is a diagram illustrating a $CO_2$ adsorbing member 40A according to a variation of the second embodiment.

The $CO_2$ adsorbing member 40A may be formed by providing multiple thin circular monocrystal substrates 41S at intervals in the container 45 of FIG. 7 as illustrated in FIG. 8.

Referring to FIG. 8, the monocrystal substrates 41S having the exhaust gas passages 42 (FIG. 7) formed therein are spaced apart from one another in the container 45. Exhaust gas is fed to an inlet 45a provided in a cap 45A at one end of the container 45, and is discharged from an outlet 45b provided in a cap 45B at the other end of the container 45. Further, the gas pipes 44 (FIG. 7) are provided in the container 45 to serve as a heat exchanger.

Further, in the configuration of FIG. 8, the porous base body 41 formed of a fired body illustrated in FIG. 7 may be used for the substrates 41S. According to this configuration, it is possible to form the $CO_2$ adsorbent layer 43 on a thin porous base body, thus allowing the $CO_2$ adsorbent layer 43 to be formed easily by CVD or ALD.

[c] Third Embodiment

FIG. 9, FIG. 10, FIG. 11, and FIG. 12 are diagrams illustrating an operation sequence of the fuel cell system 100 according to a third embodiment. In FIG. 9 through FIG. 12, the elements corresponding to those described above are referred to by the same reference numerals, and a description thereof is omitted. Further, for simplification, a description is given of the first exhaust gas processing system including the valves $Va_1$ through $Vg_1$.

Figure 9:
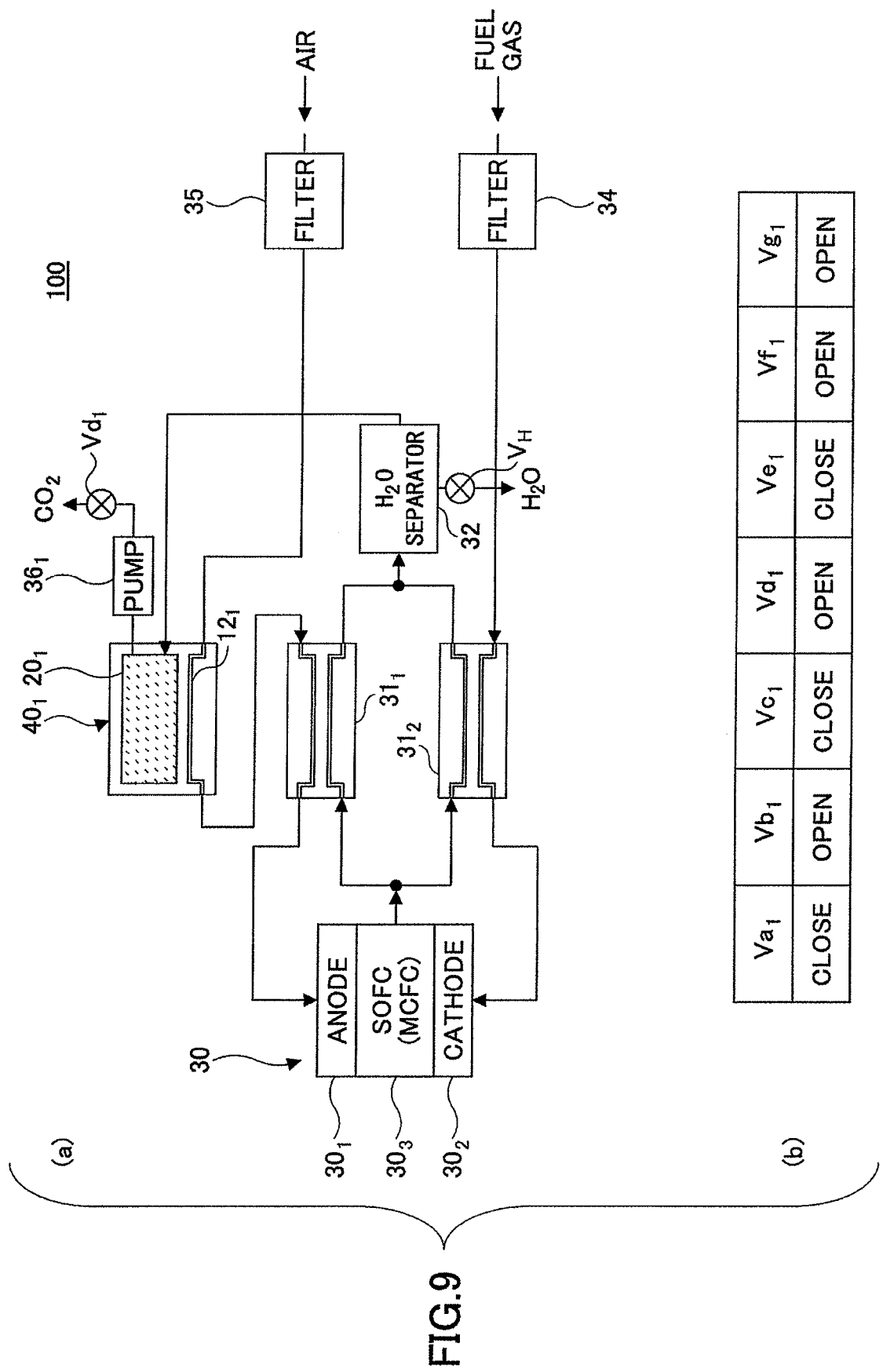
FIG. 9 is a diagram illustrating an operating state of the fuel cell system according to a third embodiment.

Referring to (a) and (b) of FIG. 9 as well as FIG. 1, at this stage in this embodiment, the valves $Va_1$ through $Vg_1$ are set the same as in the introduction process in the $CO_2$ adsorption and decomposition tank $40_1$ of Table 1, and the pump $36_1$ is driven to introduce the exhaust gas from the $H_2O$ separator 32 into the $CO_2$ adsorption and decomposition tank $40_1$.

At this point in this embodiment, not only the introduction process of step S1 illustrated in FIG. 6 but also the adsorption process of step S2 and the excess $CO_2$ discharging process of step S21 are performed in the state of FIG. 9. During this period, the valve $Vd_1$ is open and the pump $36_1$ is driven in this embodiment. Therefore, excess $CO_2$ that has not been adsorbed by the $CO_2$ adsorbing member $20_1$ in the $CO_2$ adsorption and decomposition tank $40_1$ is discharged outside the fuel cell system 100.

Figure 10:
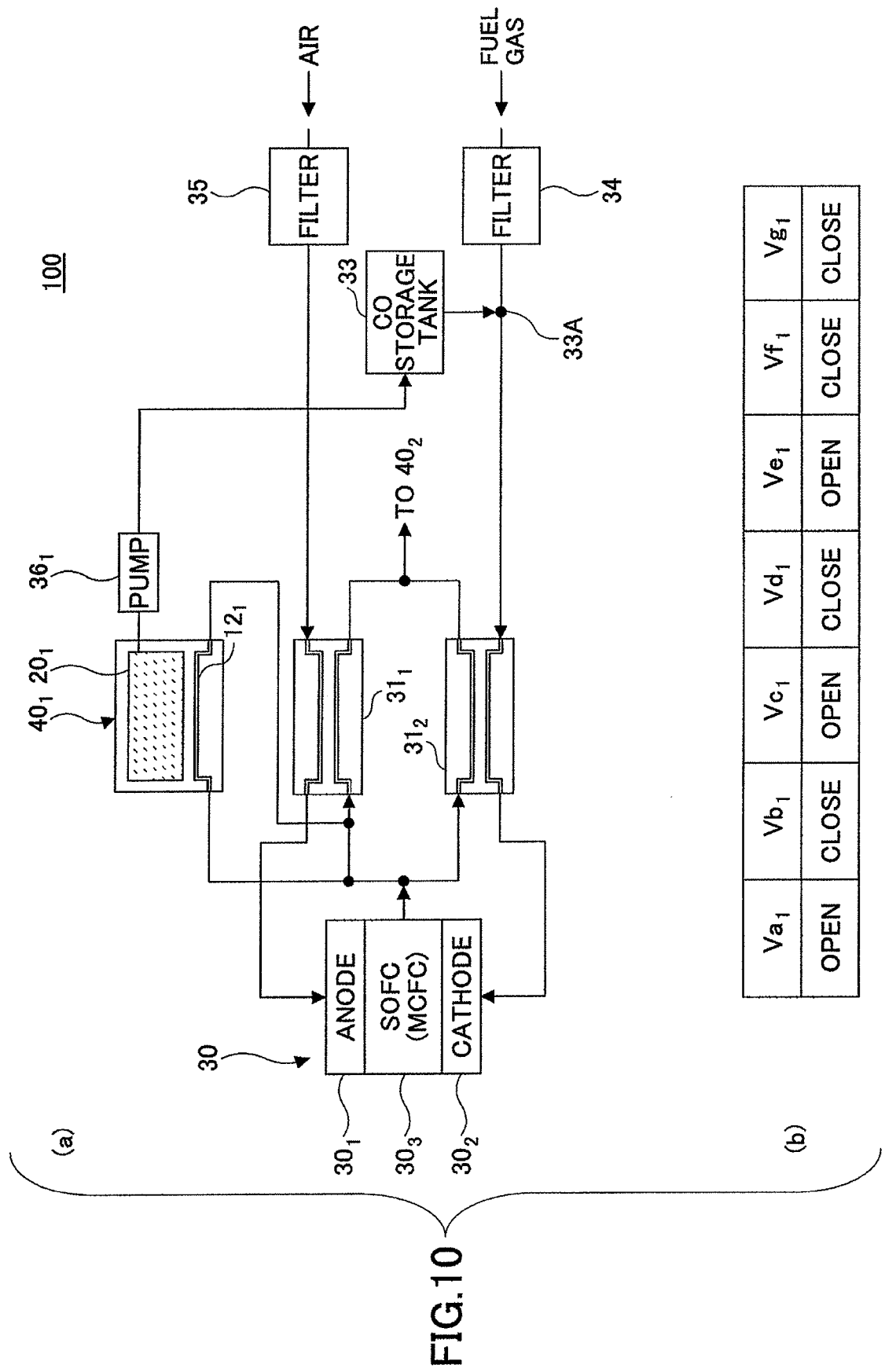
FIG. 10 is a diagram illustrating an operating state of the fuel cell system according to the third embodiment.

Next, referring to (a) and (b) of FIG. 10 as well as FIG. 1, the valves $Va_1$ through $Vg_1$ are set the same as in the decomposition process in the $CO_2$ adsorption and decomposition tank $40_1$ of Table 3, and the $CO_2$ adsorbing member $20_1$ is heated to a temperature of 200° C. to 300° C. in the $CO_2$ adsorption and decomposition tank $40_1$ and extracted CO gas is collected into the CO storage tank 33. In the state of FIG. 10, the exhaust gas that has passed through the heat exchangers $31_1$ and $31_2$ is fed to the $CO_2$ adsorption and decomposition tank $40_2$.

Figure 11:
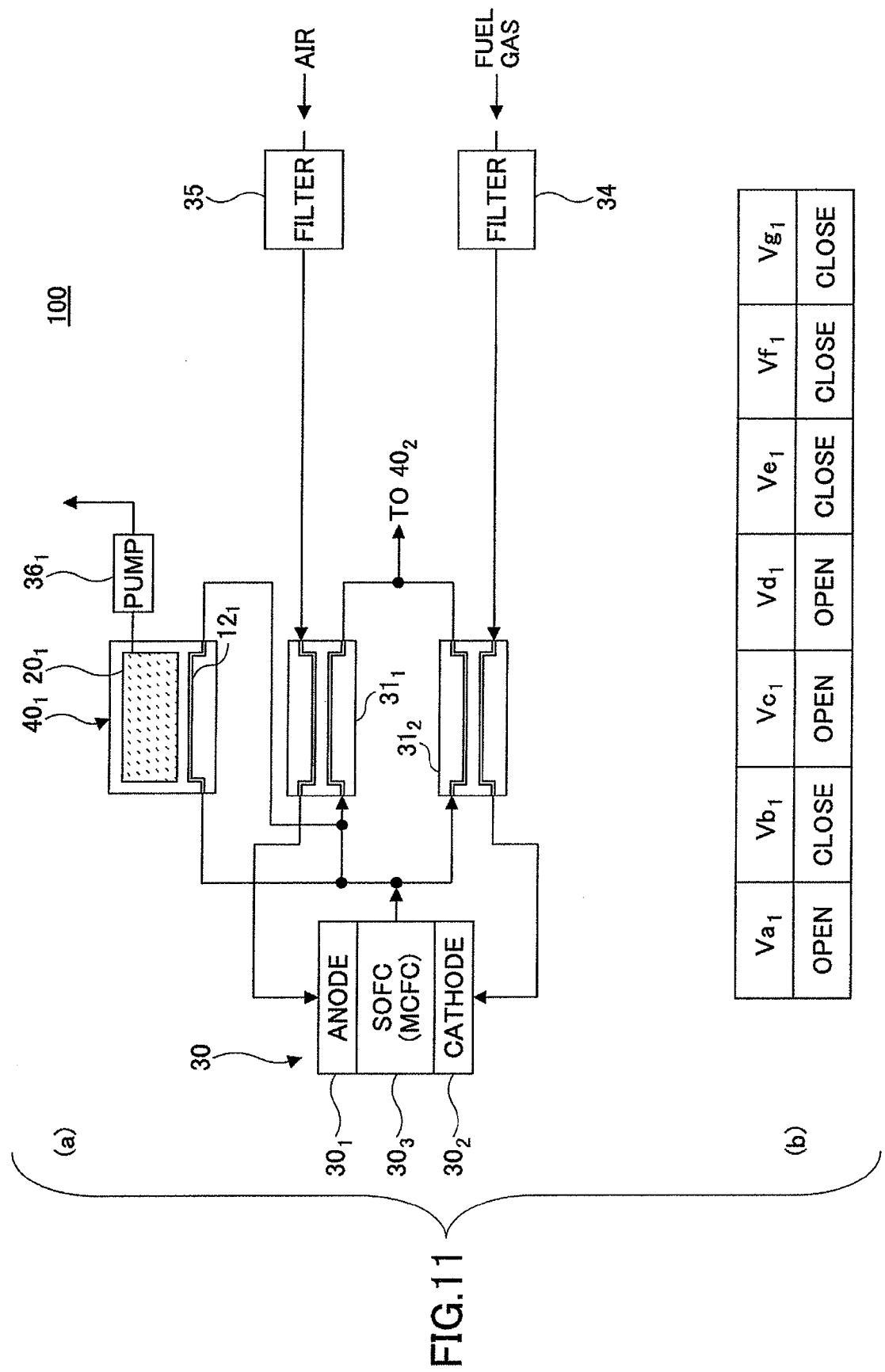
FIG. 11 is a diagram illustrating an operating state of the fuel cell system according to the third embodiment.

Then, referring to (a) and (b) of FIG. 11 as well as FIG. 1, the valves $Va_1$ through $Vg_1$ are set the same as in the regeneration process in the $CO_2$ adsorption and decomposition tank $40_1$ of Table 4, and the $CO_2$ adsorbing member $20_1$ is heated to a temperature of 600° C. to 700° C. in the $CO_2$ adsorption and decomposition tank $40_1$ and released $O_2$ gas is discharged outside the fuel cell system 100 through the valve $Vd_1$. In the state of FIG. 11 as well, the exhaust gas that has passed through the heat exchangers $31_1$ and $31_2$ is fed to the $CO_2$ adsorption and decomposition tank $40_2$.

Figure 12:
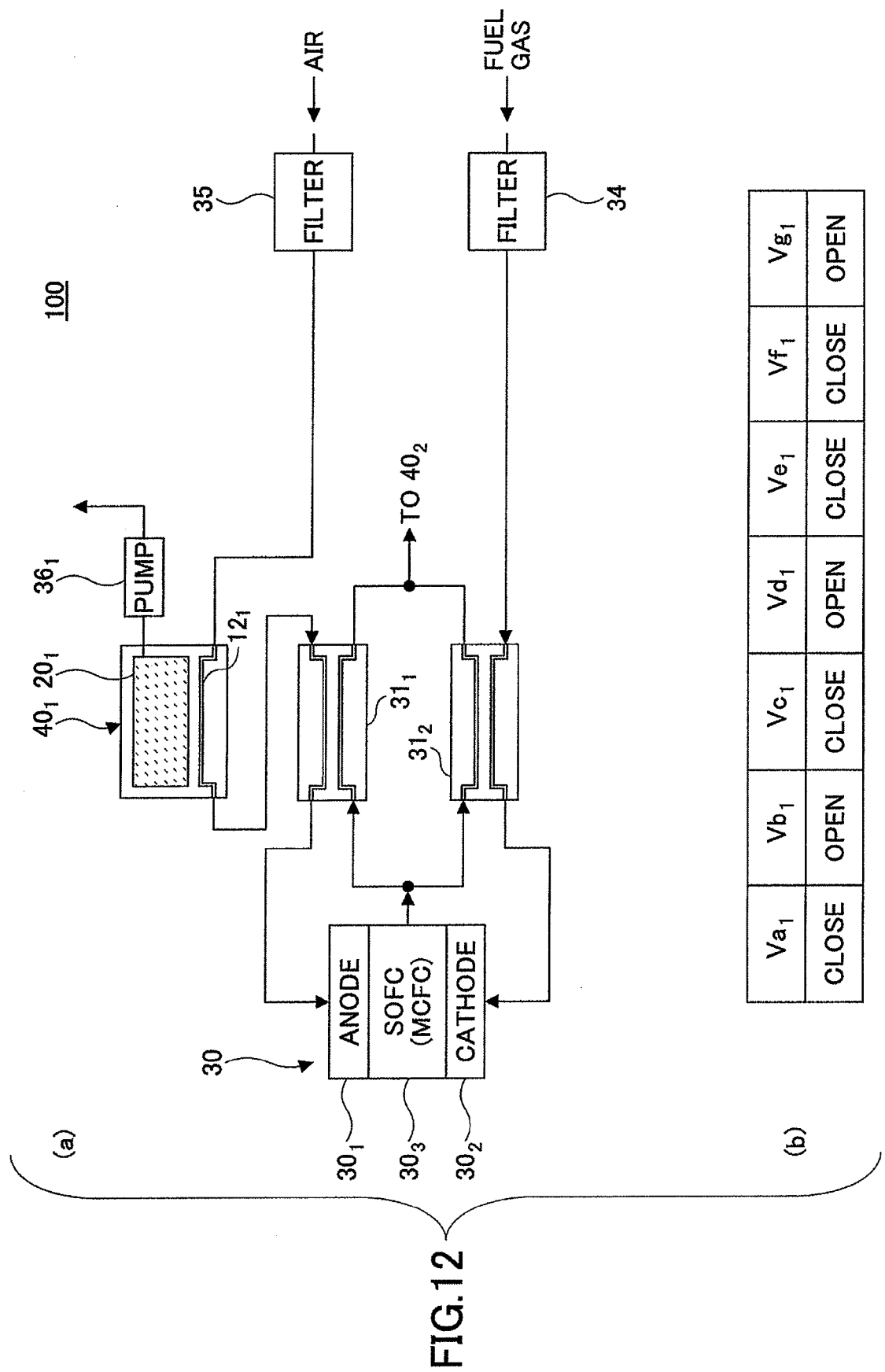
FIG. 12 is a diagram illustrating an operating state of the fuel cell system according to the third embodiment.

Then, referring to (a) and (b) of FIG. 12 as well as FIG. 1, the valves $Va_1$, $Vc_1$, $Ve_1$, and $Vf_1$ are closed and the valves $Vb_1$, $Vd_1$, and $Vg_1$ are opened, and air is fed to the heat exchanger $12_1$, so that the $CO_2$ adsorbing member $20_1$ is cooled to room temperature to 100° C. in the $CO_2$ adsorption and decomposition tank $40_1$.

According to this embodiment, the introduction process, the adsorption process, and the excess $CO_2$ discharging process may be performed while keeping the valves $Va_1$ through $Vg_1$ in the same state as illustrated in FIG. 9. This facilitates operating the fuel cell system 100.

[d] Fourth Embodiment

Figure 13:
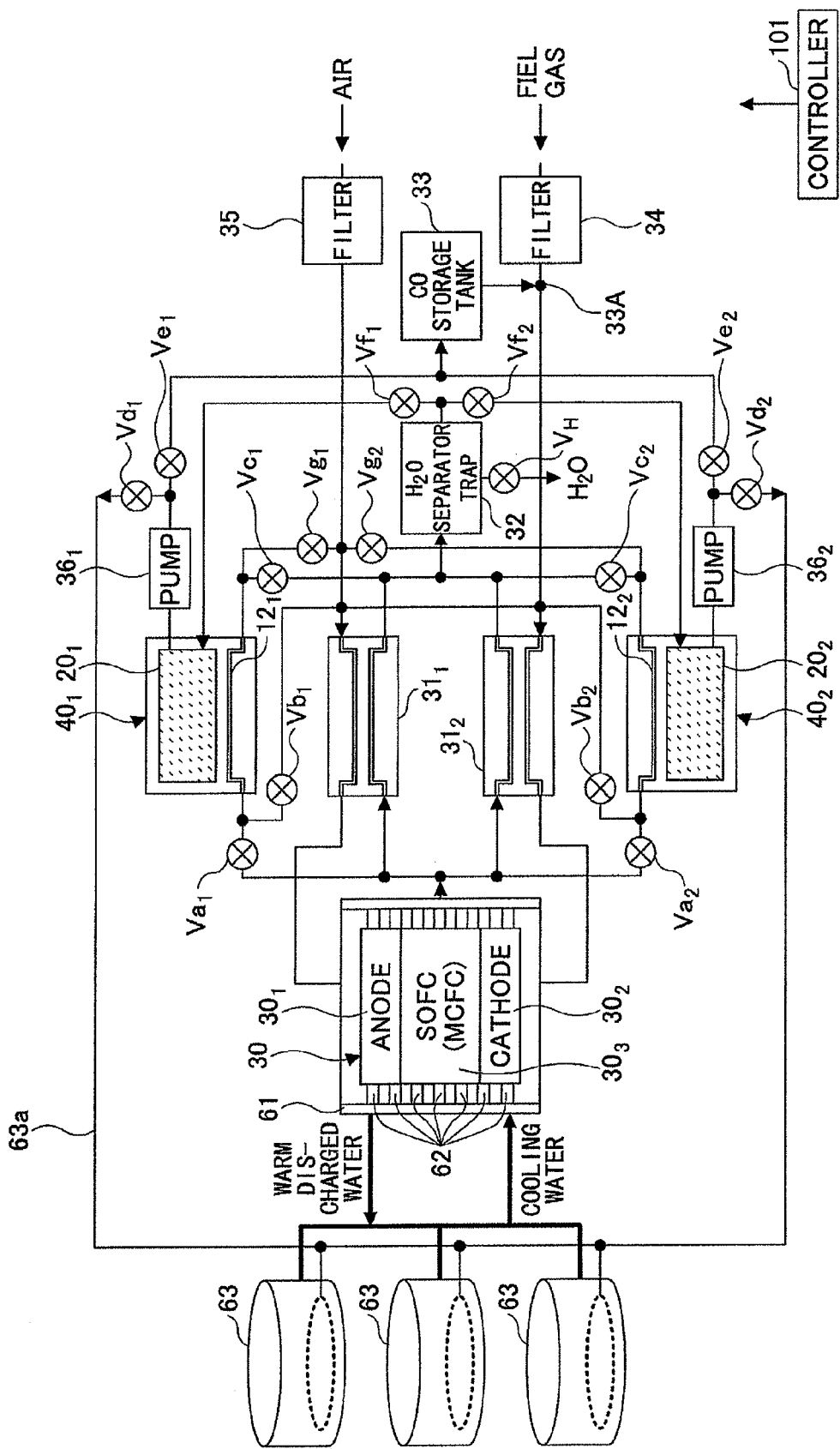
FIG. 13 is a diagram illustrating a fuel cell system according to a fourth embodiment.
Figure 14:
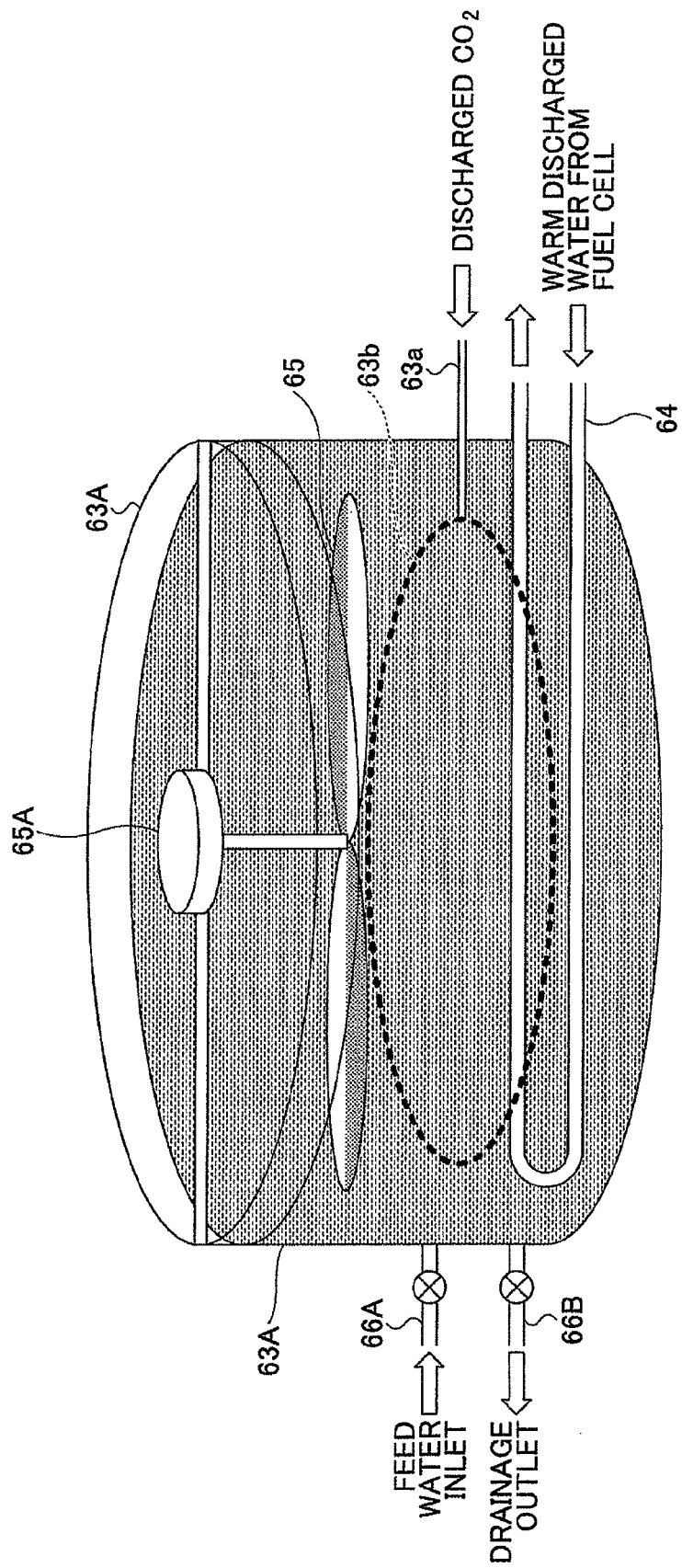
FIG. 14 is a diagram illustrating an algae culturing tank used in the fuel cell system of FIG. 13 according to the fourth embodiment.

FIG. 13 is a diagram illustrating a fuel cell system 100A according to a fourth embodiment. FIG. 14 is a diagram illustrating one of multiple algae culturing tanks 63 provided in the fuel cell system 100A of FIG. 13 to culture algae to serve as a raw material of bioethanol. In FIG. 13, the same elements as those described above are referred to by the same reference numerals.

Referring to FIG. 13, according to this embodiment, a cooling jacket 61 through which a coolant such as cooling water flows is attached to the fuel cell 30, and the multiple algae culturing tanks 63 are provided in correspondence to the cooling jacket 61. Further, according to this embodiment, multiple thermoelectric conversion elements 62 are provided inside the cooling jacket 61 to be in contact with the body of the fuel cell 30 and the interior surface of the cooling jacket 61, so as to generate electric power using the waste heat of the fuel cell 30.

Thermoelectric modules using, for example, bismuth-telluride (Bi—Te) system materials or lead-telluride (Pb—Te) system materials may be employed as the thermoelectric conversion elements 62.

Use of these thermoelectric conversion elements 62 makes it possible to further improve the energy efficiency of the fuel cell system 100A.

FIG. 14 illustrates one of the algae culturing tanks 63.

Referring to FIG. 14, the algae culturing tank 63 includes a tank body 63A, an annular nozzle member 63b including multiple nozzles, and agitating blades 65. The tank body 63A stores water to culture algae. The nozzle member 63b is submerged in the water stored in the tank body 63A, and is supplied, through an exhaust gas line 63a, with exhaust gas composed principally of $CO_2$ discharged from the valve $Vd_1$ or $Vd_2$ and discharges the exhaust gas into the tank body 63A through the nozzles. The agitating blades 65 are driven by a motor 65A to agitate the water in the tank body 63A. For example, the motor 65A is driven with part of the electric power generated in the thermoelectric conversion elements 62.

Further, the tank body 63A is provided with a feed water line 66A for feeding water to the tank body 63A from outside and a drainage line 66B for discharging the water in the tank body 63A.

Further, the warm water discharged from the fuel cell 30 flows through a discharge water pipe 64 in the tank body 63A to be used for adjusting (controlling) the temperature of the water in the tank body 63A.

Thus, according to this embodiment, $CO_2$ discharged from the fuel cell 30 is used to culture algae, and the cultured algae are used as a raw material of bioethanol. As a result, it is possible to reduce $CO_2$ released to the environment and to contribute to prevention of global warming.

In the embodiment illustrated in FIG. 13, the three algae culturing tanks 63 are provided for the single fuel cell 30. However, the number of algae culturing tanks 63 provided is not limited to three, and may be one, two, or more than three.

Thus, according to an aspect of the invention, $CO_2$ discharged from a fuel cell may be reduced to CO with a simple configuration without inputting external energy as in the conventional electrolysis process, and high energy balance may be achieved in a fuel cell system by reusing the CO as part of fuel. Further, the amount of $CO_2$ emitted as a result of electric power generation may be reduced by generating electric power using the waste heat of the fuel cell and/or by culturing algae to serve as a raw material of biofuel such as bioethanol using $CO_2$ that has not been reused, so that it is possible to contribute to prevention of global warming.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority or inferiority of the invention. Although the embodiments of the present inventions have been described in detail, it should be understood that various changes, substitutions, and alterations could be made hereto without departing from the spirit and scope of the invention.

What is claimed is:

1. A fuel cell system, comprising:
    a fuel cell configured to generate electric power with a fuel gas and oxygen gas fed thereto and to discharge an exhaust gas including $CO_2$ as a result of generating the electric power;
    a CO extraction part configured to reduce the $CO_2$ in the exhaust gas fed thereto to CO, the CO extraction part including
        a processing container fed with the exhaust gas; and
        a $CO_2$ adsorbing member provided in the processing container and formed of an oxide having an oxygen deficiency, wherein the $CO_2$ adsorbing member is configured to adsorb $CO_2$ molecules in the fed exhaust gas and to decompose the adsorbed $CO_2$ molecules into CO molecules and oxygen atoms; and
    a CO recycling part configured to feed the CO extracted by the CO extraction part to the fuel cell as a part of the fuel gas.

2. The fuel cell system as claimed in claim 1, wherein the oxide has a perovskite structure.

3. The fuel cell system as claimed in claim 1, wherein the CO extraction part further includes:
    a heating part configured to heat the $CO_2$ adsorbing member.

4. The fuel cell system as claimed in claim 3, wherein the heating part is configured to heat the $CO_2$ adsorbing member with the exhaust gas.

5. The fuel cell system as claimed in claim 3, wherein the heating part is configured to heat the $CO_2$, adsorbing member to one of a first temperature of 200° C. to 300° C. and a second temperature of 600° C. to 700° C.

6. The fuel cell system as claimed in claim 1, wherein the CO extraction part further includes:
    a cooling part configured to cool the $CO_2$ adsorbing member to a room temperature.

7. The fuel cell system as claimed in claim 1, wherein the CO extraction part further includes:
    a pump configured to evacuate the processing container.

8. The fuel cell system as claimed in claim 1, wherein the CO recycling part includes:
    a tank configured to retain the CO generated by the reduction in the CO extraction part; and
    a CO gas adding part configured to add the CO in the tank to the fuel gas.

9. The fuel cell system as claimed in claim 1, further comprising:
    a culturing tank configured to be fed with the exhaust gas from the CO extraction part, the exhaust gas including a remaining portion of the $CO_2$ unreduced in the CO extraction part, and to culture algae using the remaining portion of the $CO_2$ as a nutrient.

* * * * *